United States Patent [19]

Lackides

[11] Patent Number: 5,281,983
[45] Date of Patent: Jan. 25, 1994

[54] EYEGLASS COMFORTER

[76] Inventor: George Lackides, 1511 Sherwood Ave., Baltimore, Md. 21239

[21] Appl. No.: 46,424

[22] Filed: Mar. 16, 1993

[51] Int. Cl.$^5$ .............................................. G02C 5/12
[52] U.S. Cl. ...................................... 351/88; 351/137
[58] Field of Search ....................... 351/76, 77, 78, 79, 351/88, 102, 122, 132, 137, 158, 65, 136; 2/446

[56] References Cited

U.S. PATENT DOCUMENTS 2,501,259  3/1950  Brandt ................................ 351/76
3,186,001  5/1965  Roeder ............................... 351/138

Primary Examiner—Bruce Y. Arnold
Assistant Examiner—Darryl Collins
Attorney, Agent, or Firm—Leonard Bloom

[57] ABSTRACT

An item is described which renders a pair of eyeglasses more comfortable to the wearer. The item prevents eyeglasses from falling down on the nose of the wearer and thus promotes easier breathing. Glasses feel lighter to the wearer because the item lifts glasses away from the cheeks. Additionally, The item is adjustable to a position opposite the eyes for better vision.

7 Claims, 3 Drawing Sheets

EYEGLASS COMFORTER

FIELD OF THE INVENTION

The present invention relates to an item which renders eyeglasses more comfortable, particularly for holding eyeglasses higher on the face of a wearer so that the eyeglasses feel lighter.

BACKGROUND OF THE INVENTION

It is particularly annoying when eyeglasses constantly fall down on the nose of a wearer. If the eyeglasses are heavy and pinch the nose, breathing difficulties may be experienced. When eyeglasses fall down on the nose so that they are not directly opposite the eyes, the wearer's vision may be compromised. Also, when glasses rest on the cheeks of a wearer, the wearer often becomes fatigued. The present invention solves all of the above mentioned problems.

SUMMARY OF THE INVENTION

According, one object of the present invention is to render eyeglasses more comfortable to the wearer.

Another object of the invention is to lift eyeglasses away from the cheeks of the wearer.

Another object of the invention is to keep the eyeglasses directly opposite the eyes of the wearer.

Another object of the invention is to prevent eyeglasses from falling down on the nose of a wearer.

Another object of the invention is to provide an adjustable item to accomplish the above mentioned objects.

A final object of the invention is to provide an item which may be made as a feature of new glasses or retrofitted as an attachment to existing glasses.

These and other object of the present will become readily apparent upon further review of the following specification and drawings.

BRIEF DESCRIPTION OF THE DRAWING

Similar reference character denote corresponding features consistently throughout the attached drawings.

DETAILED DESCRIPTION OF THE PREFERRED EMBODIMENTS

Figure 1:
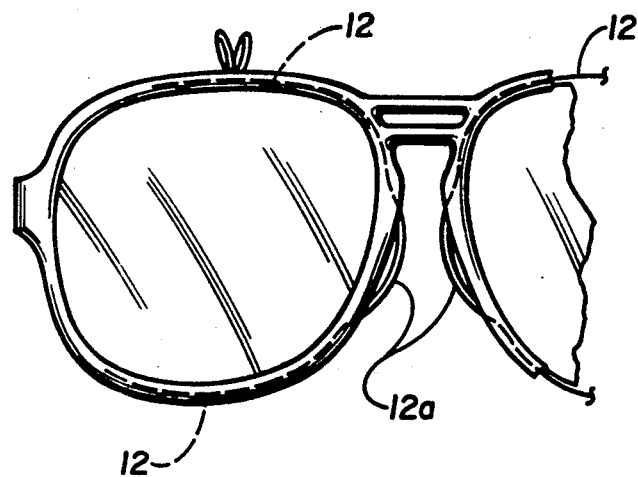
FIGS. 1, 1a and 2 are partial views of a first embodiment of the invention.
Figure 1A:
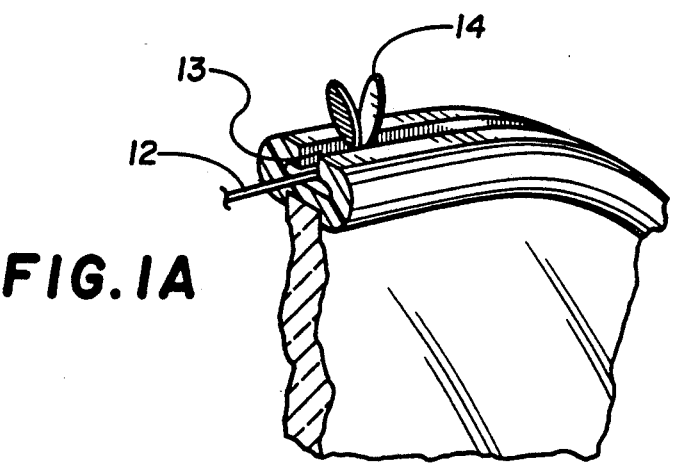
Figure 2:
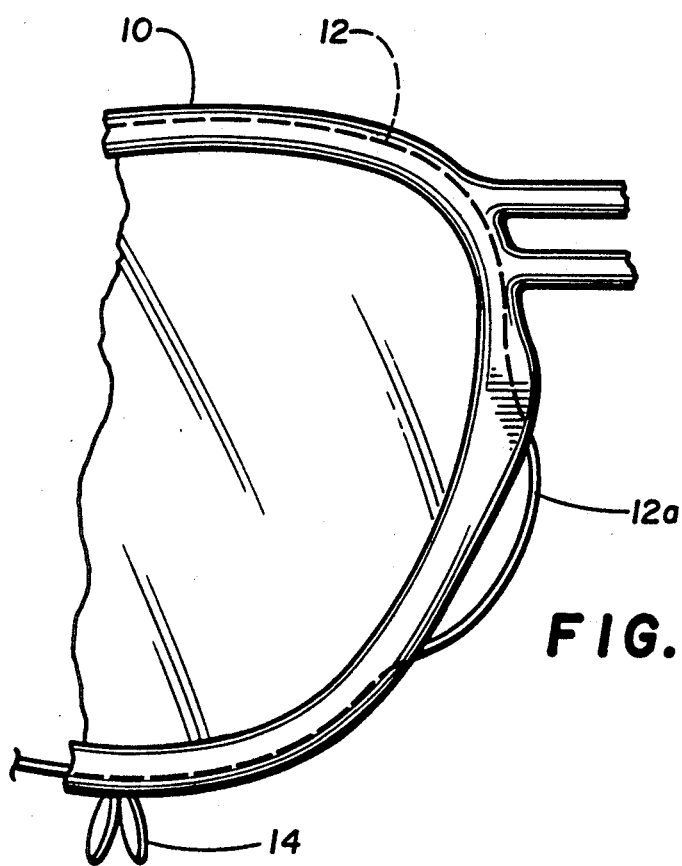

The present invention, as shown in FIG. 1, 1A and 2, is directed toward a novel item which is attached to an eyeglass frame 10. a plastic ribbon 12 is embedded in a groove 13 in the frame 10. Attached to ribbon 12 is pincher 14 which is used to move the ribbon 12 along groove 13 to form an adjustable bulge 12a on the nose piece of frame 10.

The bulge 12a helps to lift the glasses away from the cheeks of a wearer. Bulge 12a also prevents the glasses from falling down on the nose of a wearer and position the glasses directly opposite to the eyes for better vision.

As shown in FIG. 2, the pinches 14 may also be placed at the bottom of frame 10.

Figure 3:
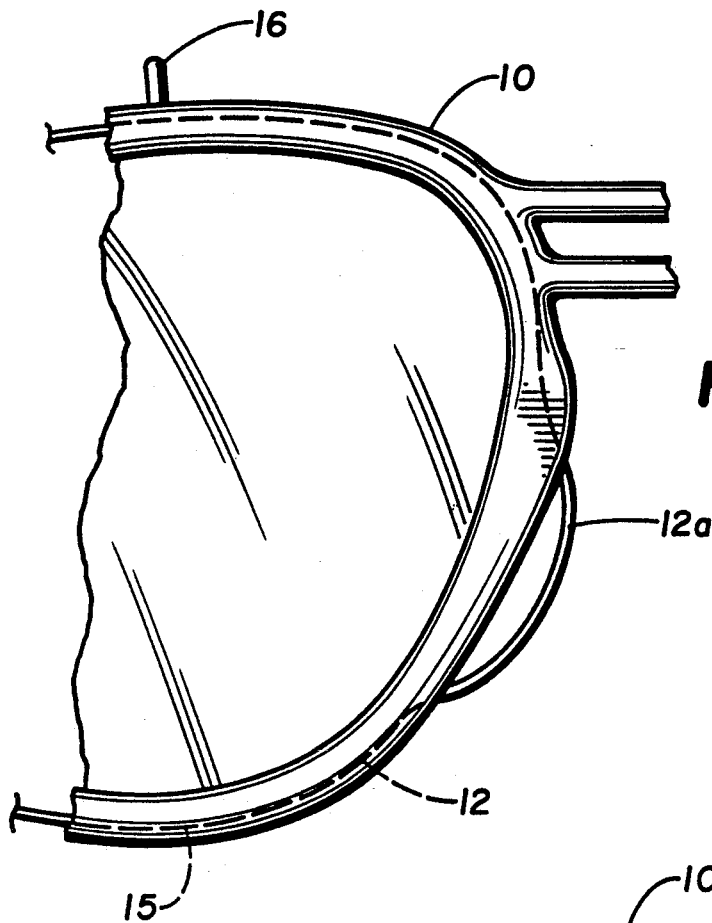
FIGS. 3 and 4 are partial views of a second embodiment.
Figure 4:
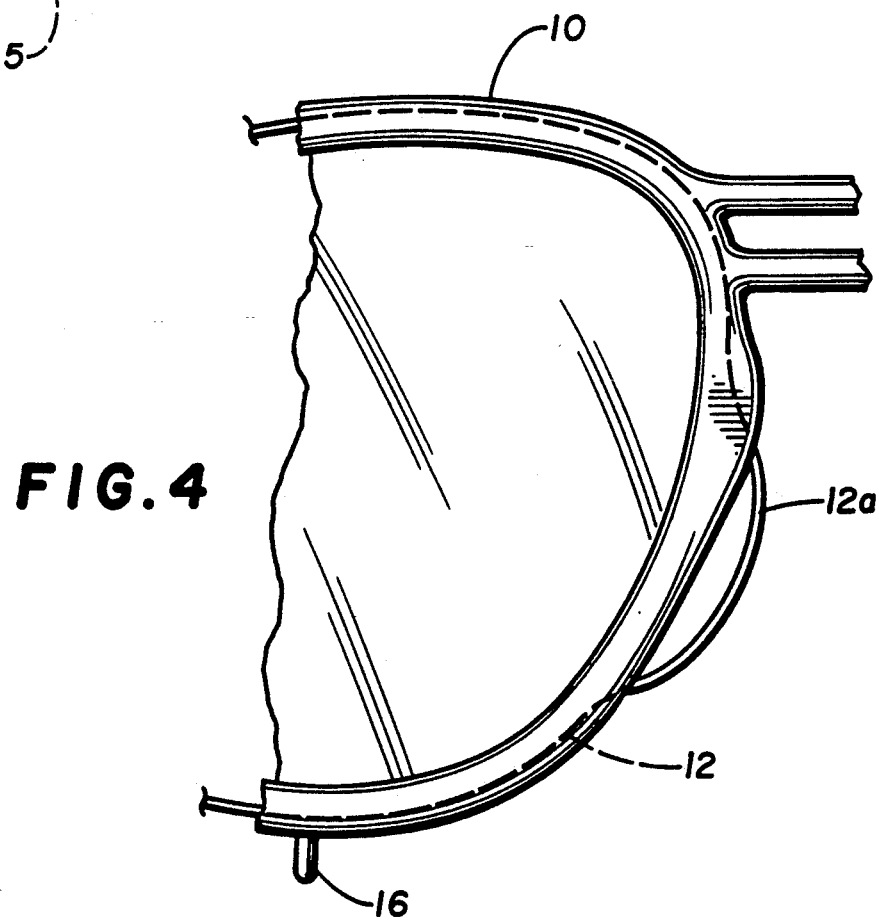

Referring to FIGS. 3 and 4, pinches 14 have been replaced by a pin 16. Pin 16 is attached to ribbon 12 and is adjustable in groove 13 by holes 15.

Figure 5:
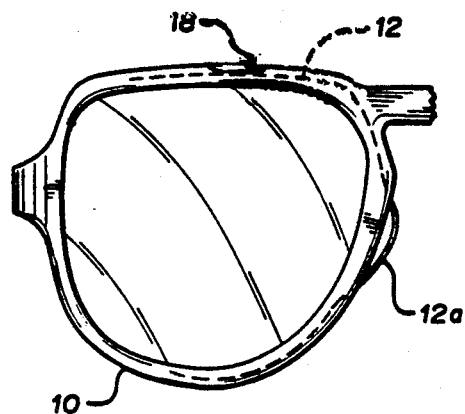
FIGS. 5, 5A and 5B are partial views of a third embodiment.
Figure 5A:
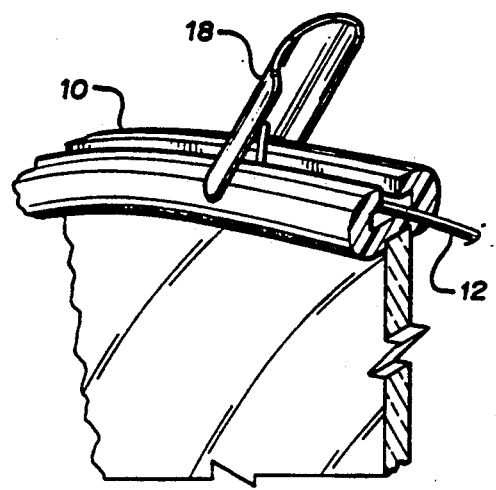
Figure 5B:
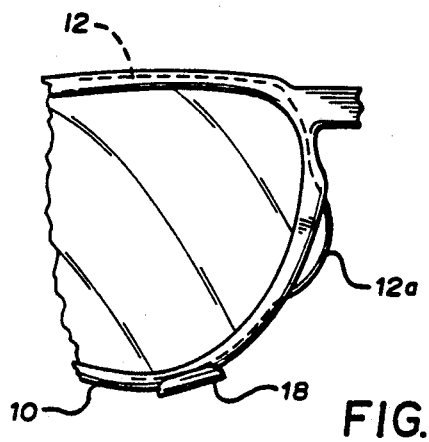

FIGS. 5, 5A and 5B show a lever 18 attached to ribbon 12. The lever 18 is disposed adjacent to the frame 10 and, when in a closed position, prevents movement of the ribbon 12. The lever 18 may be moved to an open position as shown in FIG. 5A, permitting movement of the ribbon 12, to adjust the bulge 12A of ribbon 12.

Figure 6:
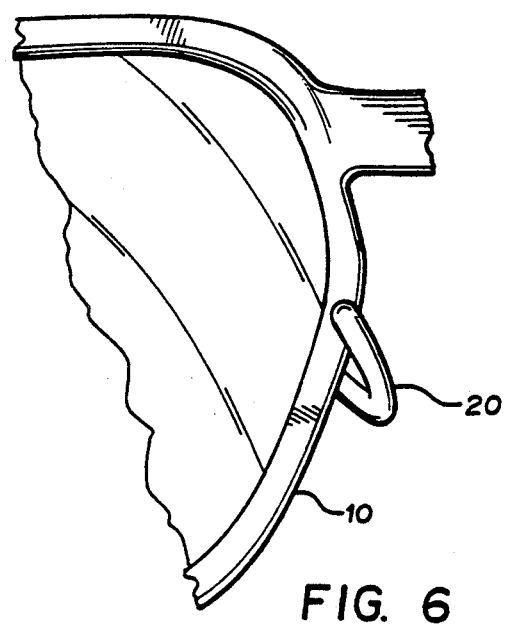
FIG. 6 is a partial view of a fourth embodiment.

FIG. 6 shows a clip 20 on frame 10. The clip 20 may be placed at different positions on the frame 10.

Figure 7:
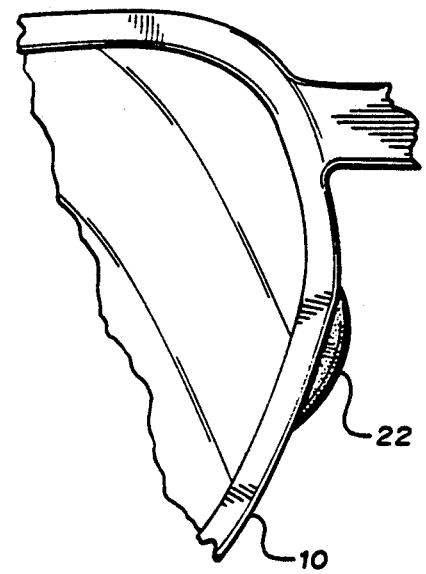
FIG. 7 is a partial view of a fifth embodiment.

FIG. 7 shows a bulge 22 which may be pressed against frame 10 and held in position by adhesive or velcro.

The embodiment shows FIGS. 1-5 may be manufactured in the eyeglasses.

The embodiments in FIGS. 6 and 7 may be added to existing glasses.

It is to be understood that the present invention is not limited to the embodiments described above, but encompasses any and all embodiments within the scope of the following claims.

I claim:

1. In a frame for a pair of eyeglasses worn by a wearer, the frame having a nose piece, an improvement comprising:
    a groove in the frame, a connector disposed in the frame, the connector being connected to a bulge disposed on the nose piece, and means for moving the connector to adjust the bulge for the comfort of the wearer.

2. The improvement of claim 10, wherein the means for moving the connector is a pincher connected to the connector.

3. The improvement of claim 1, further comprising a plurality of holes disposed in the groove, the means for moving the connector being a pin connected to the connector, the holes in the groove receiving said pin as the pin is moved to a desired position.

4. The improvement of claim 1, wherein the means for moving the connector is a lever connected to the connector, the lever being disposed adjacent to the frame and having an open position and a closed position, the closed position receiving the lever and preventing movement of the connector, the open position permitting movement of the connector.

5. An item which renders a pair of eyeglasses more comfortable, said item including a frame, a groove in said frame, a plastic ribbon in said groove, a pincher attached to said ribbon, said pincher being able to move said ribbon in said groove to form an adjustable bulge on a nose piece of said frame.

6. An item which renders a pair of eyeglasses more comfortable, said item including a frame, a groove in said frame, a plastic ribbon in said groove, a pin attached to said ribbon, holes in said groove to receive said pin, said pin being moveable in said groove to form an adjustable bulge on a nose piece of said frame.

7. An item which renders a pair of eyeglasses more comfortable, said item including a frame, a groove in said frame, a plastic ribbon in said groove, a lever attached to said ribbon, said lever being disposed adjacent to the frame and having an open position and a closed position, the closed position securing the lever and preventing movement of the ribbon, the open position permitting movement of the ribbon to form an adjustable bulge on said frame.

* * * * *